June 1, 1965 M. A. HOLE 3,186,766
VEHICULAR WHEEL WITH IMPROVED BRAKE DRUM
Filed March 15, 1963 2 Sheets-Sheet 2
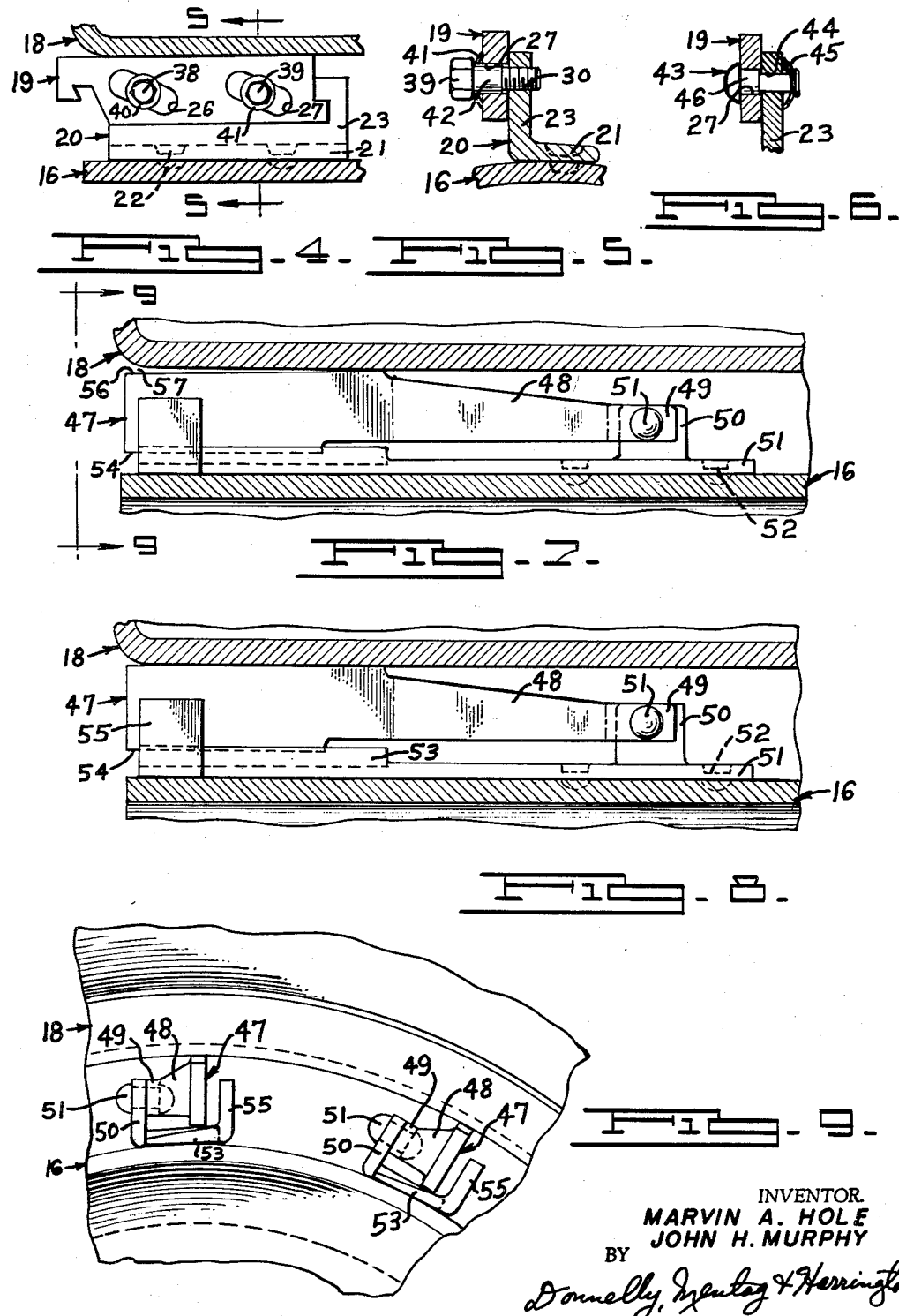
INVENTOR.
MARVIN A. HOLE
JOHN H. MURPHY
BY
ATTORNEYS United States Patent Office 3,186,766
Patented June 1, 1965

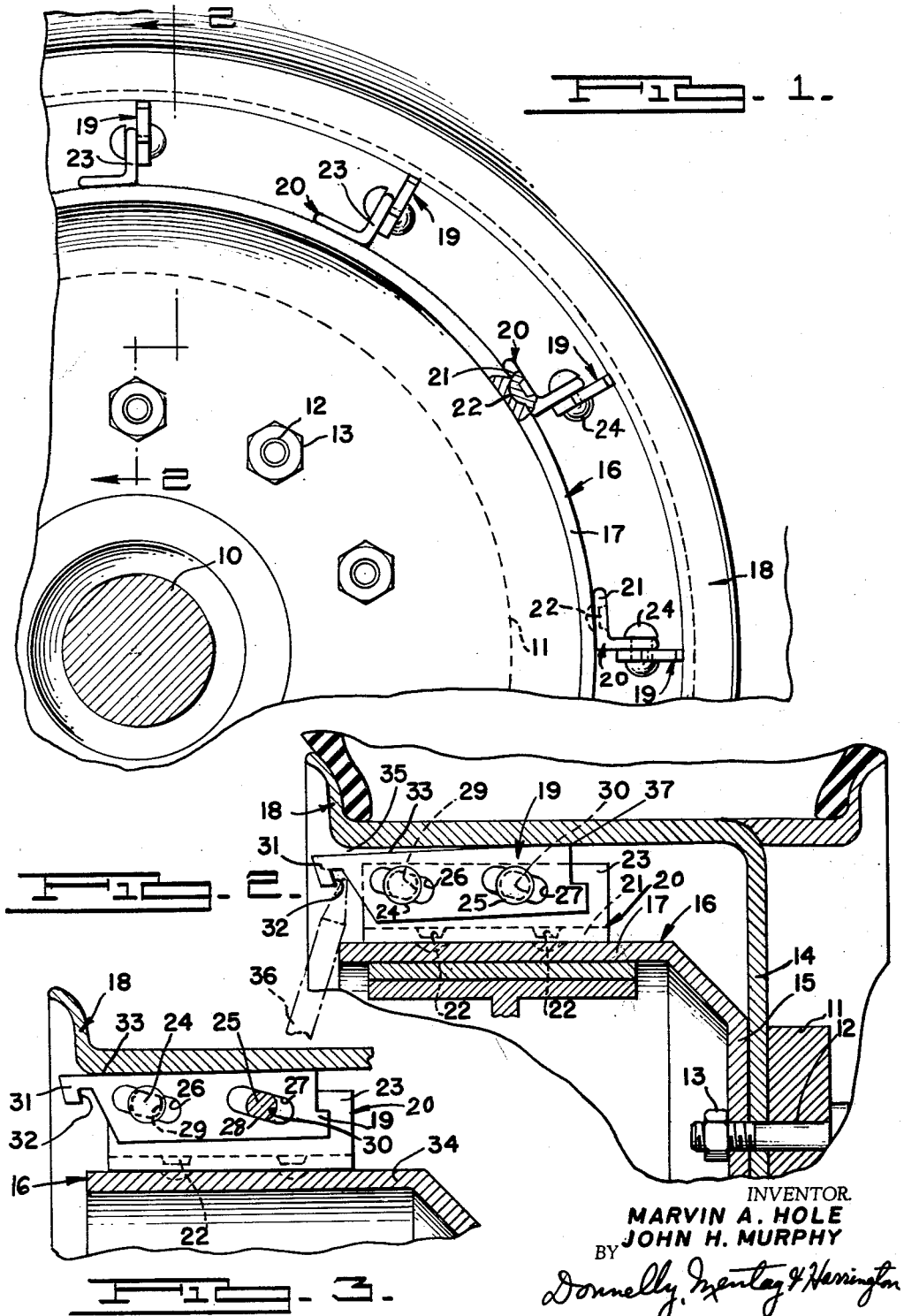

3,186,766
VEHICULAR WHEEL WITH IMPROVED
BRAKE DRUM
Marvin A. Hole, Livonia, and John H. Murphy, Dearborn, Mich., assignors to Multi-Purpose Drum Company, Detroit, Mich., a corporation of Michigan
Filed Mar. 15, 1963, Ser. No. 265,480
9 Claims. (Cl. 301—6)

This invention relates generally to improvements in vehicular wheels which are provided with brake drums that are subjected to high brake pressures and high operating temperatures.

The present invention is an improvement over the structure disclosed in our previous patent, No. 2,940,794 which issued on June 14, 1960, and especially over the structure disclosed in FIGS. 11, 12, 13 and 14 of such patent.

It is well known that the brake drums of many vehicles as, for example, large trucks and the like, are subjected to warpage or distortion due to the high temperatures and high brake pressures to which brake drums of these vehicles are subjected during operation of the vehicles. Many different types of brake drums have been provided in an attempt to overcome such distortion under high operating pressures and temperatures and improved operating results have been obtained by various brake drum constructions. One of the disadvantages of the last mentioned brake drums is that it is difficult to provide for an initial adjustment of the brake drum relative to the vehicle wheel for expansion and contraction of the brake drum without undue effect on the same. Accordingly, it is an important object of the present invention to provide an improved vehicle wheel in which the brake drum includes a plurality of compensators which may be quickly and easily adjusted manually without the use of any special tools.

It is another object of the present invention to provide a novel and improved vehicular wheel with a brake drum provided with a plurality of compensators which are fixed on the brake drum but which may be adjusted without releasing the means which secures the compensators to the brake drum. The compensators are mounted on the brake drum so as to provide quick and efficient adjustment of the same yet be self-locking due to the novel means for mounting the compensators on the brake drum.

It is a further object of the present invention to provide a novel and improved vehicular wheel which is provided with a plurality of compensators on a brake drum to absorb forces which tend to distort the brake drum yet which permit expansion and contraction of the brake drum under operating pressures and temperatures. The compensators are secured to the brake drum by suitable adjustable fastening means such as a novel rivet arrangement, a screw and dished spring washer structure, or a stud and spring clip structure, so that the compensators are fixed on the brake drum yet permit quick and easy adjustment of the same without releasing adjustable fastening means.

It is still another object of the present invention to provide an improved vehicular wheel provided with a brake drum having adjustable compensators for preventing warpage of the brake drum and wherein the compensators may be quickly and accurately adjusted without having to first loosen any fastening means holding the compensators on the brake drum and without having to use a feeler gauge for setting each individual compensator. The compensators of the present invention are mounted on mounting brackets on the brake drum at a slight angle, with the inner ends thereof being disposed at a point slightly higher than the outer ends, whereby when the compensators are adjusted outwardly to bring the same into contact with the vehicle wheel, the inner ends of the compensators make a point contact with the vehicle wheel so that when the brake drum expands due to operating pressures and temperatures said inner ends will slightly bite or dig into the vehicle wheel to prevent backing off or loosening of the compensators to provide a self-locking effect between the compensator and its mounting bracket.

It is still a further object of the present invention to provide an improved vehicular wheel having a brake drum provided with a plurality of compensators to permit the brake drum to expand and contract without distortion and wherein the mounting structure for the compensators may be separately made and attached to the brake drum. The brake drum and mounting means of the present invention may be made from steel instead of cast iron whereby a lighter and cheaper brake drum may be provided. A brake drum made from steel may be made faster and with less labor since there are less machining operations to be made on a steel drum as compared to a cast iron drum.

It is still another object of the present invention to provide a novel and improved vehicular wheel having a brake drum provided with compensators to permit contraction and expansion of the brake drum without distortion of the same and which drum is compact and rugged in construction, light in weight, economical of manufacture and which has optimum strength characteristics when compared to the weight and wall thicknesses of the brake drum.

It is a further object of the present invention to provide a vehicular wheel comprising a tire rim and a brake drum concentrically mounted therein, the brake drum having a plurality of circumferentially spaced legs extending outwardly toward the tire rim, a plurality of compensators, fastening means for adjustably attaching one of said compensators to each of said legs, means for adjusting the compensators so that only the edge of one end of their outer surfaces engages the tire rim under low brake pressures or low operating temperatures of the drum, and the entire surface of each of the compensator outer surfaces engages the tire rim under higher brake pressures or operating temperatures of the drum.

Other objects, features and advantages of this invention will be apparent from the following detailed description, appended claims and the accompanying drawings.

In the drawings:

FIG. 1 is a fragmentary, front, elevational view of a wheel having a tire rim thereon and a brake drum made in accordance with the principles of the present invention;

FIG. 2 is a fragmentary, elevational, sectional view of the structure illustrated in FIG. 1, taken along the line 2—2 thereof and looking in the direction of the arrows;

FIG. 3 is a fragmentary, sectional view similar to FIG. 2, but showing the drum expansion compensator in an operative position to withstand distortion force due to high braking pressures and high operating temperatures;

FIG. 4 is a fragmentary, elevational view of a screw and dished washer means for holding the compensators on the brake drum;

FIG. 5 is an elevational sectional view of the structure illustrated in FIG. 4, taken along the line 5—5 thereof and looking in the direction of the arrows;

FIG. 6 is an elevational sectional view similar to FIG. 5 and showing another embodiment of a fastening means comprising a stud and spring clip structure;

FIG. 7 is a fragmentary, elevational sectional view similar to FIG. 2 and showing another embodiment of the invention with the compensator in an inoperative position;

FIG. 8 is a fragmentary, sectional view similar to FIG. 7, but showing the drum expansion compensators in an operative position to withstand distortion forces due to high braking pressures and high operating temperatures; and, FIG. 9 is an enlarged, fragmentary end elevational view of the structure illustrated in FIG. 7, taken along the line 9—9 thereof and looking in the direction of the arrows.

Referring now to the drawing, and in particular to FIG. 1, the numeral 10 comprises a conventional wheel axle shaft which extends from a drive flange 11. The drive flange 11 is provided with the usual drill holes through which are mounted suitable bolts 12 secured in place by nuts 13 for holding a wheel flange 14 in place thereon. Secured to the drive flange 11 and the wheel flange 14, is the inner wall 15 of the brake drum which is generally indicated by the numeral 16. The brake drum 16 is provided with the usual integral annular flange 17 as shown in FIG. 2. The wheel flange 14 is integral with the usual tire rim 18.

As shown in the drawing, the brake drum 16 is made from a suitable steel material which is pressed by any suitable method into the final brake drum form. It is an advantage to make the brake drum from steel, as compared to cast iron, as steel brake drums can be made cheaper. The lower cost of making the brake drum out of steel results from the fact that less labor and time is involved in making a steel brake drum. Furthermore, a steel brake drum requires a lower friction lining for the brakes as compared to the friction lining required for a cast iron brake drum. A further advantage of the steel type brake drum is that it will not crack or break as compared to a cast iron brake drum. A steel brake drum is also lighter in weight than a comparable cast iron brake drum. The walls of a steel brake drum are thinner than a comparable cast iron brake drum whereby the heat transfer characteristics are more efficient. A steel type brake drum operates at a lower temperature and provides more efficient braking because the heat is dissipated faster from the brake drum due to the smaller wall thickness as compared to a cast iron brake drum.

As shown in FIG. 1, the brake drum 16 is provided with a plurality of compensators generally indicated by the numerals 19. As shown in FIGS. 1 and 2, each of the compensators is fixedly mounted in place on the periphery of the brake drum 16 in circumferentially spaced apart positions by means of angle bracket mounting means generally indicated by the numeral 20. Each of the angle bracket mounting means comprises the horizontal leg 21 which is fixedly secured to the outer surface of the brake flange 17 by any suitable means as by projection welding indicated by the numerals 22. The vertical leg 23 of each of the angle bracket mounting means 20 extends outwardly from the periphery of the brake drum flange 17 and is radially disposed relative to each other.

As shown in FIGS. 1, 2 and 3, the expansion and contraction compensators 19 are fixedly but adjustably mounted on the angle bracket legs 23 by means of a pair of rivets indicated by the numerals 24 and 25. The compensators 19 are provided with the sloping slots 26 and 27 which are formed so as to have the lower end thereof disposed inwardly of the brake drum and the upper end thereof disposed outwardly of the brake drum whereby the slots 26 and 27 slope upwardly and outwardly. As shown in FIG. 3, the upper and lower sides of the rivets 24 and 25 are flattened as indicated by the numeral 28 and these flattened surfaces 28 provide a seating area for engagement with the sloping edges of the slots 26 and 27. The rivets 24 and 25 also extend through suitable outer and inner holes as 29 and 30 formed through the radially disposed angle bracket mounting legs 23. The hole 29 is disposed radially inward of the hole 30, or below or downwardly relative to the hole 30 a distance of about .008–.009 of an inch.

As shown in FIGS. 2 and 3, each of the compensators 19 is substantially rectangularly shaped, when viewed from the side thereof, and is provided on the outer end thereof with the longitudinal extension 31 on the lower side of which is formed the screw driver recess 32 for adjusting the compensators outwardly. The upper surface 33 of the compensators 19 are flat and straight and would be disposed parallel to the periphery 34 of the brake drum flange 17 if the rivet holes 29 and 30 were not disposed on different horizontal planes as described hereinabove. It will be seen that with the uneven disposition of the rivet holes 29 and 30 that the upper surfaces 33 of the adjusters 19 are disposed so as to slant or slope downwardly and outwardly at a slight angle so as to provide a clearance of approximately .015 of an inch between the outer surface 33 of the compensators and the inner surface of the tire rim 18 at the outer end of the tire rim flange 18 as indicated by the numeral 35.

In use, the brake drum 16 is mounted within the tire rim 18 with the rivets 24 and 25 holding the compensators 19 fixedly in place under a pinch pressure or pinch force which is sufficient to hold the compensators in place, yet permit them to be adjusted. The compensators 19 are disposed so as to clear the inner surface of the tire rim 18. After the brake drum has been properly mounted in the tire rim 18, the compensators may be quickly and efficiently and accurately moved into operative position against the tire rim 18 by grasping a screw driver 36, inserting the end into the recess 32 in each of the compensators and sliding the compensators outwardly until the inner end 37 of each of the compensators engages the inner peripheral surface of the tire rim 18. As shown in FIG. 2, the screw driver would be rotated in a counterclockwise direction, so as to pivot it around the outer end of the brake drum flange 17, and slide each of the compensators 19 outwardly. Although the compensators 19 are held in place by a suitable pinch force, they may be moved easily outwardly to the desired tire rim engaging position. In order to remove the brake drum, the compensator 19 may be simply tapped inwardly by means of a hammer to break their engagement with the tire rim 18.

It will be seen that due to the point contact at the inner end 37 on each of the compensators 19, the brake drum 16 may expand and contract so as to bring their upper surfaces 33 into engagement with the tire rim 18, as shown in FIG. 3. When the brake drum 16 expands to the position of FIG. 3, it will be seen that the compensator inner ends or corners 37 will bite into the tire rim 18 and lock the compensators 19 in place on the angle bracket legs 23 due to the uneven disposition of the rivet holes 29 and 30. The improved brake drum construction of the present invention permits limited expansion of the brake drum without distortion of the same since the brake drum is uniformally restrained by the tire rim and will not be distorted to any objectionable extent.

A modified means for holding the compensators in place on the brake drum mounting flange legs 23 is shown in FIGS. 4 and 5. The compensator 19 is held on the angle bracket leg 23 in this modified embodiment by means of a pair of screws 38 and 39 which are adapted to pass through the slots 26 and 27 respectively, in the compensator 19 and be threaded into the holes 29 and 30 in the angle bracket leg 23. A pair of suitable conventional dished spring washers 40 and 41 are mounted between the compensator 19 and the heads of the screws 38 and 39 to provide a suitable pinch pressure to retain the compensator 19 in place but yet permit adjustment of the same in the same manner as described hereinbefore for the embodiment of FIGS. 1, 2 and 3. The holes in the angle bracket leg 23 into which the screws 38 and 39 are threaded are disposed unevenly in the same manner as was described hereinbefore for the first embodiment. The screws 38 and 39 are provided with an enlarged shoulder portion 42 which may be provided with serrations or the like to provide a frictional grip on the compensator 19 and aid in preventing backing off of the compensator 19. The compensators 19 which are secured in place by means of the screw and lock washer structures of FIGS. 4 and 5 will function in the same manner as the compensators held in place by the rivets of FIGS. 2 and 3. The compensators 19 may also be termed adjusters.

A further modified means for holding the compensators 19 in place on the brake drum flange legs 23 is shown in FIG. 6. In this embodiment, a stud as generally indicated by the numeral 43 is mounted through the sloping slots 26 and 27 in the compensator 19 and it extends through suitable holes as 44 in the legs 23. The stud 43 is retained in place by means of a conventional spring clip 45 of any suitable design. The stud 43 is provided with an enlarged shoulder 46 which engages the edges of the slots 26 and 27 and which may be provided with serrations or the like to provide a frictional grip on the compensator 19 and aid in preventing backing-off of the compensator 19.

FIGS. 7, 8 and 9 illustrate a further embodiment of the invention in which the compensator is swingably mounted. In this embodiment the compensator is indicated generally by the numeral 47 and it is provided with an integral inwardly extended arm 48. The inwardly extended arm 48 slopes inwardly and laterally from the compensator 47 and is integrally connected to the offset arm extension 49 which is disposed parallel to the compensator 47. The arm extension 49 is swingably mounted on compensator leg 50 by means of a suitable rivet 51.

The compensator leg 50 is mounted on the mounting plate 51 which is fixedly connected to the brake drum 16 as by projection welding indicated by the numeral 52. As shown in FIG. 9, a sloping cam 53 is formed on the outer end of the mounting plate 51 and the compensator lower surface or edge 54 is mounted on this sloping cam 53. A vertical stop member 55 is mounted on one side of the cam portion 53.

In use, the brake drum 16 is mounted within the tire rim 18 with the compensator member 47 disposed laterally apart from the stop members 55 and moved down the sloping cam 53 to permit clearance between the compensators and the tire rim 18. The brake drum 16 is first turned clockwise as viewed in FIG. 9 to insure backing-off of the compensators 47 from the cam portions 53 so that the wheel and drum can be assembled. The brake drum 16 is then turned counter-clockwise as viewed in FIG. 9 until the compensator portions 47 move up the respective cams 53 and simultaneously engage the tire rim 18 as shown in FIG. 7. The upper surfaces 56 of the compensators 47 slope downwardly and outwardly so that the inner edges thereof engage the tire rim in point or line contacts. When the brake drum 16 expands to the position shown in FIG. 8 it will be seen that the compensator inner ends of the upper surfaces thereof will bite into the tire rim 18 and lock the compensators 47 in place on the cams 53. Further expansion of the brake drum 16 will bring the sloping upper surface 56 into complete engagement with the inner peripheral surface of the tire rim 18 as shown in FIG. 8. It will be seen that a clearance of approximately 0.15 of an inch exists between the outer surfaces 56 of the compensators 47 and the inner surface of the tire rim 18 at the outer end of the tire rim flange 18, as indicated by the numeral 57.

While it will be apparent that the preferred embodiments of the invention herein disclosed are well calculated to fulfill the objects above stated, it will be appreciated that the invention is susceptible to modification, variation and change without departing from the proper scope or fair meaning of the subjoined claims.

What we claim is:

1. A vehicular wheel comprising: a tire rim and a brake drum concentrically mounted therein, the brake drum having a plurality of circumferentially spaced legs extending outwardly toward the tire rim, a plurality of compensators having radially outer surfaces, and fastening means for adjustably attaching one of said compensators to each of said legs so that the outer surfaces slope downwardly and outwardly, and only the edge of one of their outer surfaces engages the tire rim under low brake pressures or low operating temperatures of the drum, and the entire surface of each of the compensator outer surfaces engages the tire rim under higher brake pressures or operating temperatures of the drum.

2. The combination of elements as defined in claim 1 in which said means for adjustably attaching a compensator to each of said legs comprises at least one outwardly and upwardly sloping elongated hole formed through each compensator and a rivet mounted through said elongated hole and secured to the leg supporting each compensator.

3. The combination of elements as defined in claim 1 in which said means for adjustably attaching a compensator to each of said legs comprises at least one outwardly and upwardly sloping elongated hole formed through each compensator and a screw mounted through said elongated hole and threadably connected to the leg supporting each compensator with a spring washer mounted between each screw head and compensator.

4. A combination of elements as defined in claim 1 in which said means for adjustably attaching a compensator to each of said legs comprises at least one outwardly and upwardly sloping elongated hole formed through each compensator and a stud mounted through said elongated hole and slidably mounted through a hole in the leg supporting each compensator, and a retainer spring clip mounted on the stud and extending through the hole in the leg to retain the stud in place.

5. The combination of elements as defined in claim 1 in which said means for adjustably attaching a compensator to each of said legs comprises at least two outwardly and upwardly sloping elongated holes formed through each compensator, one of said sloping holes being inwardly disposed toward the inner end of the compensator and the other one toward the outer end of the compensator, a rivet mounted through each of said elongated holes and secured to the leg supporting each compensator, and the rivet mounted through said inwardly disposed hole being secured to the compensator leg at a position radially outward of the position of the rivet mounted through the other hole.

6. The combination of elements as defined in claim 1 in which said means for adjustably attaching a compensator to each of said legs comprises at least two outwardly and upwardly sloping elongated holes formed through each compensator, one of said sloping holes being inwardly disposed toward the inner end of the compensator and the other one toward the outer end of the compensator, a screw mounted through each of said elongated holes and threadably connected to the leg supporting each compensator with a spring washer mounted between each screw head and compensator, and the screw mounted through said inwardly disposed hole being secured to the compensator leg at a position radially outward of the position of the screw mounted through the other hole.

7. The combination of elements as defined in claim 1 in which said means for adjustably attaching a compensator to each of said legs comprises at least two outwardly and upwardly sloping elongated holes formed through each compensator, one of said sloping holes being inwardly disposed toward the inner end of the compensator and the other one toward the outer end of the compensator, a stud mounted through each of said elongated holes and slidably mounted through a hole in the leg supporting each compensator, a retainer spring clip mounted on each of the stud ends extending through the holes in the leg to retain the studs in place, and one of the stud holes formed in the leg being opposite said inwardly disposed elongated hole and being formed in the compensator leg at a position radially outward of the position of the other stud hole.

8. A vehicular wheel comprising: a tire rim and a brake drum concentrically mounted therein, the brake drum having a plurality of circumferentially spaced legs extending outwardly toward the tire rim, a plurality of compensators having radially outer surfaces, and fastening means for adjustably attaching one of said compensators to each of said legs so that the outer surfaces slope downwardly and outwardly, and only the edge of one end of their outer surfaces engages the tire rim under low brake pressures or low operating temperatures of the drum, and the entire surface of each of the compensator outer surfaces engages the tire rim under higher brake pressures or operating temperatures of the drum, said fastening means for adjustably attaching a compensator to each of said legs comprising an arm connected to the inner end of the compensator, the inner end of said arm being swingably mounted to a leg, a sloping cam on the brake drum, and the lower surface of the compensator being disposed to engage said sloping cam to retain the swingably mounted compensator against the tire rim.

9. A vehicular wheel comprising: a tire rim and a brake drum concentrically mounted therein, the brake drum having a plurality of circumferentially spaced legs extending outwardly toward the tire rim, a plurality of compensators having radially outer surfaces, and fastening means for adjustably attaching one of said compensators to each of said legs so that the outer surfaces slope downwardly and outwardly, and only the edge of one end of their outer surfaces engages the tire rim under low brake pressures or low operating temperatures of the drum, and the entire surface of each of the compensator outer surfaces engages the tire rim under higher brake pressures or operating temperatures of the drum, said fastening means for adjustably attaching a compensator to each of said legs comprising at least one outwardly and upwardly sloping elongated hole formed through each compensator, a pair of spaced apart fastener members mounted through said elongated hole and connected to the leg supporting each compensator, and said fastener members being mounted on a sloping plane non-parallel to the plane of the elongated hole and converging at the inner end toward the elongated hole.

References Cited by the Examiner

UNITED STATES PATENTS 2,940,794  6/60  Murphy et al. _____ 301—6

ARTHUR L. LA POINT, *Primary Examiner.*